Jan. 11, 1944.   R. A. HEYDEN   2,338,850
EDUCATIONAL DEVICE
Filed Oct. 10, 1942
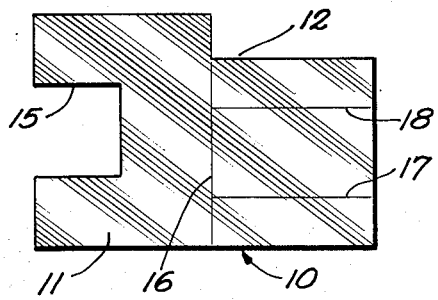
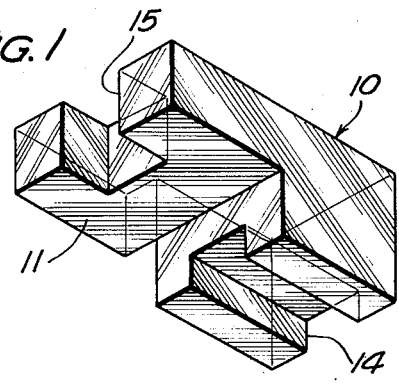
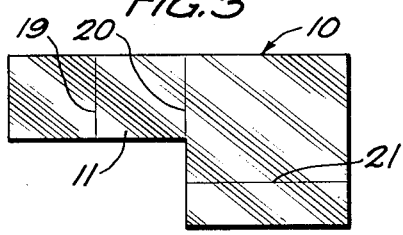
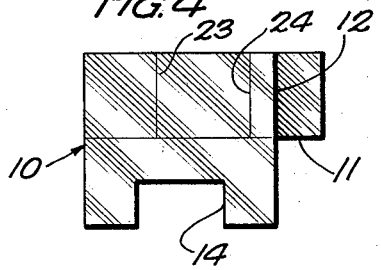
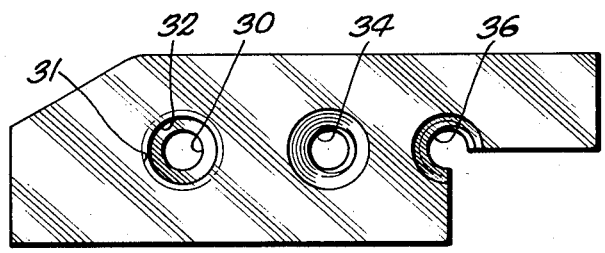
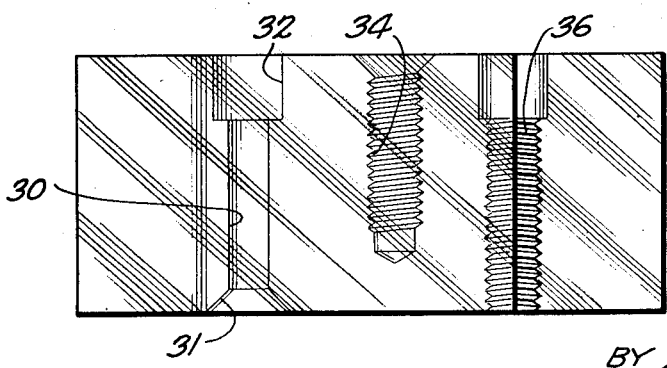
INVENTOR
R. A. HEYDEN
BY Harry L. Duft
ATTORNEY Patented Jan. 11, 1944

2,338,850

UNITED STATES PATENT OFFICE 2,338,850

EDUCATIONAL DEVICE

Robert A. Heyden, Riverside, Ill., assignor to Western Electric Company, Incorporated, New York, N. Y., a corporation of New York Application October 10, 1942, Serial No. 461,516

2 Claims. (Cl. 35—26)

This invention relates to educational devices, and more particularly to demonstration models for teaching blueprint reading and mechanical drawing.

When learning to make mechanical drawings, students sometimes have difficulty in visualizing or determining the position of the hidden lines or portions of the objects being drawn. Also, when learning to read blueprints, some students have difficulty in understanding the significance of broken or dotted in lines and in distinguishing between the various technical terms conventionally employed, such as counter-sink, counter-bore, under-cut, etc. These difficulties, obviously, increase the learning time of the students.

An object of the present invention is to eliminate the above mentioned difficulties by providing transparent demonstration models through which the hidden lines and portions thereof are clearly visible from any side of the model.

In accordance with one embodiment of the invention, demonstration models of irregular shaped objects are provided which are composed of a transparent material of a type through which the outlines of the normally concealed portions of the objects are clearly visible from all sides of the objects.

A more complete understanding of the features and advantages of the invention will become apparent from the following detailed description when read in conjunction with the accompanying drawing, in which Fig. 1 is a perspective view of a transparent demonstration model embodying the features of the invention;

Figs. 2, 3 and 4 are plan, side and end views, respectively, of the model shown in Fig. 1;

Fig. 5 is a plan view of another form of transparent demonstration model embodying the invention, and Fig. 6 is a front elevational view thereof.

Referring now to the drawing, the demonstration model illustrated in Figs. 1 to 4, inclusive, comprises a block 10 of transparent material, one end of which is under-cut to provide a portion 11 of reduced thickness. At its opposite end, a vertical corner notch 12 and a horizontal bottom groove or under-cut 14 are provided. Also, the reduced end portion 11 is provided with a vertical end slot or groove 15.

The transparent material from which the above described demonstration model is constructed is of a type through which the several cut-outs are clearly visible from all sides of the model. Thus, the extent of the under-cut reduced portion 11 of the model is readily determined from the upper surface of the model by a line 16 (Fig. 2) which is clearly visible from the upper surface of the model, as are also lines 17 and 18 by which the width of the under-cut groove 14 may be determined from the upper surface of the model. Similarly, from the front side of the model, as shown in Fig. 3, the depth of vertical groove 15, the extent of corner notch 12 and the depth of under-cut groove 14 are readily determined by lines 19, 20 and 21, respectively, which are clearly visible from the front side of the model. Likewise, the width of the end groove 15 is readily determined from the opposite end surface of the model by the clearly visible lines 23 and 24 (Fig. 4). It will be apparent, therefore, that by viewing the model from the several surfaces thereof, a student learning to draw will clearly see how the hidden portions of the model should be shown in the several views. Also, with the aid of such models, a student learning to read blue prints will readily understand the significance of broken or dotted in lines.

Another form of transparent demonstration models embodying the invention is shown in Figs. 5 and 6. This model is provided with a cylindrical bore 30 having a counter-sink 31 at one end and a counter-bore 32 at its opposite end which are clearly visible through the transparent material so that the student will clearly see how they should be dotted in in the views in which they are normally concealed. A counter-sunk threaded hole 34 and a counter-bored threaded hole 36 are also provided in the model for illustrating how these should be shown when concealed from the view of the observer. A portion of this model is cut away to illustrate how the threaded hole 36 should be drawn in a half sectional view thereof.

Although various types of transparent materials may be used in the construction of the demonstration models, it has been found that acrylic resins, such as methyl methacrylate are particularly suitable for this purpose because they are moldable and machinable and, therefore, readily formed into models of various irregular shapes.

It is to be understood that the invention is not limited to the particular embodiments thereof herein illustrated and described, but is capable of other applications within the scope of the appended claims.

What is claimed is:

1. An educational device for teaching blueprint reading and mechanical drawing comprising a demonstration model made of solid transparent material and having irregular contours so as to show substantially all normally concealed boundaries in visible outline from any side of the model.

2. An educational device for teaching blueprint reading and mechanical drawing comprising a model made from moldable and machineable transparent solid material and having one or more machined contours so that all normally hidden lines are substantially visible from all sides of the model.

ROBERT A. HEYDEN.